United States Patent
Emig et al.

(10) Patent No.: US 11,015,713 B2
(45) Date of Patent: May 25, 2021

(54) SEAL AND SEAL ASSEMBLY COMPRISING THE SEAL

(71) Applicant: Carl Freudenberg KG, Weinheim (DE)

(72) Inventors: Juergen Emig, Grasellenbach (DE); Ross Dixon, Newcastle Upon Tyne (GB)

(73) Assignee: CARL FREUDENBERG KG, Weinheim (DE)

( * ) Notice: Subject to any disclaimer, the term of this patent is extended or adjusted under 35 U.S.C. 154(b) by 138 days.

(21) Appl. No.: 16/242,024

(22) Filed: Jan. 8, 2019

(65) Prior Publication Data

US 2019/0219172 A1 Jul. 18, 2019

(30) Foreign Application Priority Data

Jan. 12, 2018 (DE) ...................... 10 2018 000 181.5

(51) Int. Cl.
*F16J 15/3232* (2016.01)
*F16J 15/56* (2006.01)
(Continued)

(52) U.S. Cl.
CPC .......... *F16J 15/3232* (2013.01); *F16F 9/362* (2013.01); *F16J 15/3224* (2013.01); *F16J 15/3252* (2013.01); *F16J 15/3276* (2013.01); *F16J 15/3284* (2013.01); *F16J 15/56* (2013.01); *F16F 2230/30* (2013.01)

(58) Field of Classification Search
CPC .. F16J 15/3224; F16J 15/3232; F16J 15/3252; F16J 15/3276; F16J 15/3284; F16J 15/56; F16F 9/362; F16F 2230/30
See application file for complete search history.

(56) References Cited

U.S. PATENT DOCUMENTS 2,191,873 A * 2/1940 Victor .................. F16J 15/3252
277/561
2,208,482 A * 7/1940 Victor .................. F16J 15/3248
277/569
(Continued)

FOREIGN PATENT DOCUMENTS

DE 19930964 A1 3/2001
EP 1909002 A1 4/2008
(Continued)

*Primary Examiner* — Gilbert Y Lee
(74) *Attorney, Agent, or Firm* — Leydig, Voit & Mayer, Ltd.

(57) ABSTRACT

A seal includes: a seal ring, having at least one dynamically stressed seal lip; a supporting ring made of a toughened material; and a connecting device made of an elastomeric material. The seal ring and the supporting ring are connected to one another. The supporting ring includes a radial leg, to which, in a radial direction, the seal lip is fixed. The radial leg is formed of two parts and, in the radial direction, has arranged a first partial leg and, in an other radial direction has arranged a second partial leg. The partial legs are associated adjacent with a first radial distance and delineate a first gap. The first partial leg is connected with the seal lip. The first and the second partial legs are fixed to one another by the connecting device. The connecting device, when viewed in cross section, has an axial length and a radial height.

14 Claims, 1 Drawing Sheet

(51) Int. Cl.
*F16F 9/36* (2006.01)
*F16J 15/3224* (2016.01)
*F16J 15/3252* (2016.01)
*F16J 15/3276* (2016.01)
*F16J 15/3284* (2016.01)

(56) References Cited

U.S. PATENT DOCUMENTS

| | | | | |
|---|---|---|---|---|
| 2,249,141 A | * | 7/1941 | Johnson | F16J 15/3248 |
| | | | | 277/575 |
| 2,264,062 A | * | 11/1941 | Wilder | F16J 15/3212 |
| | | | | 277/575 |
| 2,797,938 A | | 7/1957 | Reynolds | |
| 5,595,697 A | * | 1/1997 | Wada | F16J 15/3244 |
| | | | | 264/135 |
| 9,689,431 B2 | * | 6/2017 | Walter | F16C 33/7896 |
| 2018/0347702 A1 | * | 12/2018 | Sakano | F16J 15/3232 |

FOREIGN PATENT DOCUMENTS

EP 2116738 A1 11/2009
JP 2011158035 A 8/2011

\* cited by examiner

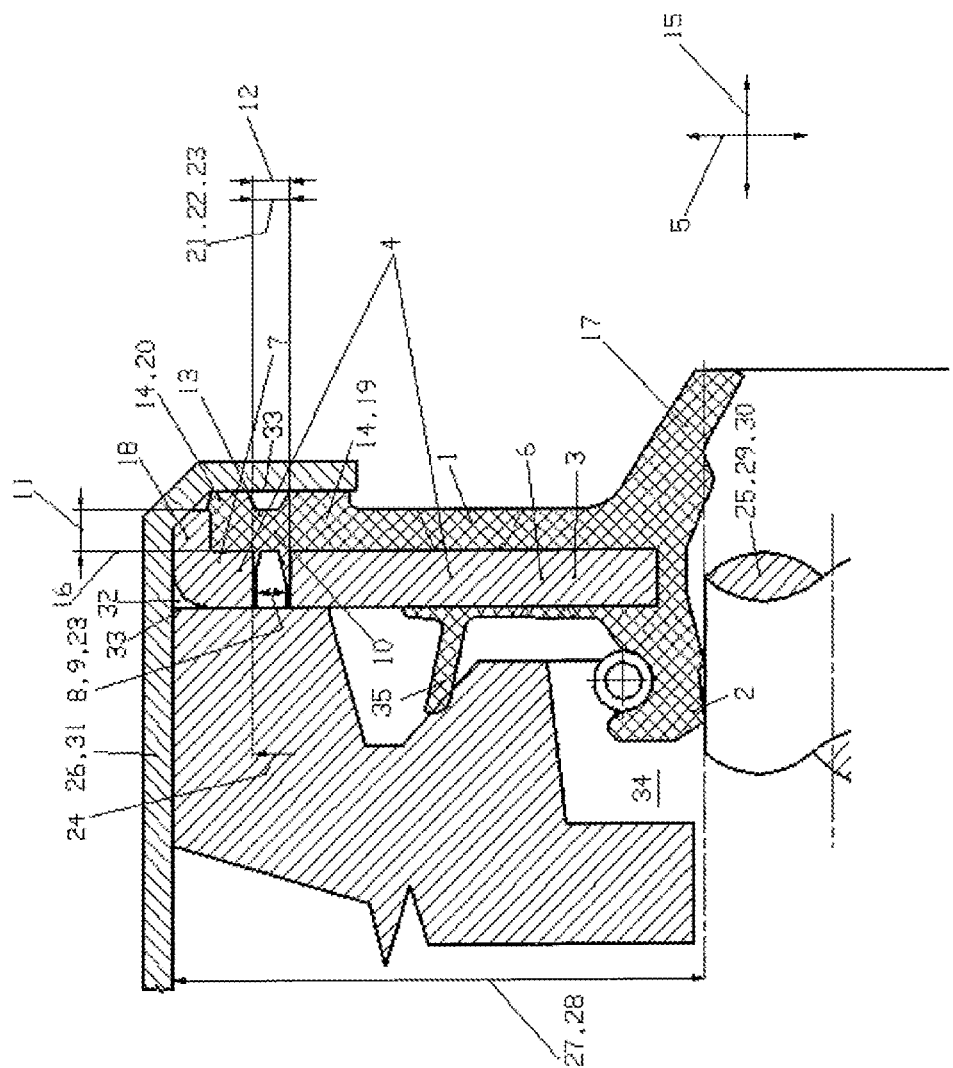

SEAL AND SEAL ASSEMBLY COMPRISING THE SEAL

CROSS-REFERENCE TO PRIOR APPLICATION

Priority is claimed to German Patent Application No. DE 10 2018 000 181.5, filed on Jan. 12, 2018, the entire disclosure of which is hereby incorporated by reference herein.

FIELD

The invention relates to a seal and a seal assembly comprising the seal, wherein the seal comprises a seal ring, having at least one dynamically stressed seal lip and a support ring from a toughened material, wherein the seal ring and the support ring are connected to one another, wherein the support ring comprises a radial leg, to which, in radial direction, on the one hand, the seal lip is fixed, wherein the radial leg is formed in two parts and, on the one hand, in radial direction, has arranged a first partial leg and, on the other hand, in radial direction has arranged a second partial leg, wherein the partial legs are associated adjacent with a first radial distance and delineate a first gap, wherein the first partial leg is connected with the seal lip, and wherein the first and the second partial leg are fixed to one another by a connecting device made of an elastomeric material.

BACKGROUND

Such a seal and such a seal assembly are known from DE 199 30 964 A1.

The seal is designed as a radially movable piston rod seal and is used for sealing hydraulic, pneumatic, or hydropneumatic units.

A piston rod to be sealed is guided in a piston rod guide, located in a housing, and sealed towards the environment by the piston rod seal. The piston rod seal comprises a static seal part on the housing side and a dynamic seal part on the piston rod side, which sealingly cooperates with the circumferential outer surface of the piston rod via at least one seal lip. A connecting device, which can be deflected radially with little force, is provided between the static seal part and the dynamic seal part and is connected to the seal parts in a pressure-tight manner.

In shock absorbers for motor vehicles, radial deflection movements of the piston rod arise due to the operation, for example, by bending the piston rod as a result of shear forces.

To be able to keep the contact pressure between the dynamically stressed seal lip of the seal and the piston rod as low as possible in order to reduce the friction, a smooth radial mobility of the dynamically stressed seal lip with the lowest radial force is desired. For this purpose, the connecting device is provided between the static seal part and the dynamic seal part and is movable as freely as possible in the radial direction and is intended to ensure a tight connection of the seal parts.

The connecting device is designed in the form of a rolling bellows-like thin elastomer fold, which is movable smoothly in the radial direction. The maximum radial mobility of the elastomer fold is dimensioned to be the maximum deflection of the piston rod to be sealed in the same direction.

SUMMARY

In an embodiment, the present invention provides a seal, comprising: a seal ring, having at least one dynamically stressed seal lip; a supporting ring comprising a toughened material; and a connecting device comprising an elastomeric material, wherein the seal ring and the supporting ring are connected to one another, wherein the supporting ring comprises a radial leg, to which, in a radial direction, the seal lip is fixed, the radial leg being comprised of two parts and, in the radial direction, has arranged a first partial leg and, in an other radial direction has arranged a second partial leg, the partial legs being associated adjacent with a first radial distance and delineating a first gap, the first partial leg being connected with the seal lip, the first and the second partial legs being fixed to one another by the connecting device, and wherein the connecting device, when viewed in cross section, has an axial length and a radial height, the axial length substantially corresponding to the radial height.

BRIEF DESCRIPTION OF THE DRAWINGS

The present invention will be described in even greater detail below based on the exemplary figure. The invention is not limited to the exemplary embodiments. Other features and advantages of various embodiments of the present invention will become apparent by reading the following detailed description with reference to the attached drawings which illustrate the following:

The FIGURE shows a section of the seal assembly from a shock absorber in the region of its cover in schematic representation.

DETAILED DESCRIPTION

The object of the invention is to develop a seal and a seal assembly of the type mentioned at the outset such that they are formed more robust overall, in particular that they can be used for permanently sealing higher pressures without damaging or destroying the connecting device.

To achieve the object, a seal is provided, comprising a seal ring, comprising at least one dynamically stressed seal lip and a support ring made of a toughened material, wherein the seal ring and the support ring are connected to one another, wherein the support ring comprises a radial leg, to which, in radial direction, on the one hand, the seal lip is fixed, wherein the radial leg is formed in two parts and, on the one hand, in radial direction, has arranged a first partial leg and, on the other hand in radial direction has arranged a second partial leg, wherein the partial legs are associated adjacent with a first radial distance and delineate a first gap, wherein the first partial leg is connected with the seal lip, wherein the first and the second partial leg are fixed to one another by a connecting device of an elastomeric material, wherein the connecting device, when viewed in cross section, has an axial length and a radial height and wherein the axial length substantially corresponds to the radial height.

Furthermore, to solve the object, a seal assembly is provided, comprising a seal as described above and a first machine element to be sealed, which is surrounded by a second machine element, wherein the seal is arranged in the third gap formed by the third radial distance.

In this case, it is advantageous that the seal and the seal assembly as a whole are of robust design, due to the embodiment of the connecting device according to the invention, and can also permanently seal high pressures to be sealed, as can occur, for example, in shock absorbers of motor vehicles.

In sectional view, the connecting device has a substantially square cross section. As a result, the connecting device can easily seal higher pressures, such as occur, for example, in shock absorbers of motor vehicles, during a long service life. Pressure peaks occurring that act on the robust connecting device will also not impair their long useful life.

Due to the rubber-elastic connection device, for example, manufacturing related or installation related tolerances of the seal or seal assembly are well compensated, as well as transverse forces that act on the seal due to operational conditions.

The radial mobility of the connecting device and thus of the seal lip is sufficiently good for normal applications. Due to the rubber-elastic resilience of the connecting device in the radial direction, the seal lip touches the machine element to be sealed despite the robustly formed connecting device with sufficiently low contact pressure, so that the seal encloses the machine element to be sealed with only slight sealing friction and nevertheless reliably sealing.

The seal ring may comprise at least one statically stressed seal. The statically stressed seal is usually fixed to the support ring on the side facing radially away from the seal lip and seals a housing, for example a cover of a shock absorber, statically with respect to the environment.

The connecting device can form an integral component of the statically stressed seal. It is advantageous in this case that the seal can thereby be produced overall simply and cost-effectively.

The first gap formed by the first radial distance is preferably substantially free from the material of the connecting device. Since elastomeric materials by definition are incompressible, however a sufficient radial compliance of the first partial leg with the seal lip located thereon relative to the second partial legs should be provided, such a configuration is an advantage. Due to the material-free first gap, the two partial legs of the radial leg have a sufficiently large resilience in the radial direction relative to one another.

Although the connecting device connects the two partial legs to one another and the partial legs are arranged in a common radial plane, said connecting device is located in the axial direction outside of the first gap.

The connecting device is preferably arranged on the side of the radial leg facing away from the seal lip in the axial direction and covers the matching end face of the first gap in the radial direction.

A buffer seal for the seal lip can be arranged on the side of the radial leg which faces away axially from the seal lip. This buffer seal protects the seal lip from exposure to impurities from the environment. In this way, the wear of the seal lip is reduced to a minimum if the seal is used in a heavily contaminated environment, for example in shock absorbers of construction vehicles.

In the axial direction between the seal lip and the buffer seal, a lubricant reservoir filled with barrier grease can be arranged if required. Sealing lip and buffer seal are thereby better lubricated and impurities are kept even better away from the dynamically stressed seal lip.

The buffer seal and the seal lip may integrally transition into each other and may be formed of the same material. This also promotes a simple and cost-effective manufacturability of the seal.

The static seal and the buffer seal may integrally transition into each other and may be formed of the same material.

The seal has the simplest and most cost-effective manufacturability if the static seal, the connecting device, the buffer seal, and the seal lip merge integrally and are formed of the same material. In such a case, the seal consists essentially only of the radial leg formed of two-parts having a first and second partial leg and of the components which consist of elastomeric material, namely the static seal, the connecting device, the buffer seal and the seal lip, which are injection-molded onto the radial leg.

According to an advantageous embodiment, it can be provided that the second partial leg radially circumferential encloses the first partial leg and has an axial leg. The seal is then formed to radially seal from the inside and can be used as shock absorber seal for the seal of piston rods.

The axial leg is preferably formed as protruding axially against the seal lip. Here it is advantageous that the second partial leg with its axial leg forms an axial force limiter for the statically stressed seal in the installation space. In the installed state of the seal, it is compressed in the installation space in the axial direction, for example by a beaded cover of a shock absorber housing, until the housing abuttingly contacts the axial leg. Further compression in the axial direction is then no longer possible. The axial compression force of the statically stressed seal is thereby limited, and undesirably high mechanical stresses, which could reduce the service life, are avoided.

The statically stressed seal may comprise first and second seal beads, arranged in close proximity with a second radial distance, wherein the second gap formed by the second radial distance is substantially free of the material of the statically stressed seal. The two seal beads statically seal the installation space in the housing.

It is of advantage if the first gap and the second gap each have a substantially matching radial width. Here it is advantageous that the connecting device is arranged free in the axial direction between the first and the second gap and, in the axial direction, contacts neither the partial legs nor, for example, the cover of the housing in an abutting manner. An operationally induced radial compression of the connecting device is easily possible because the material of the compressed connecting device can escape unimpeded in both axial directions. Displacements of the two partial legs in the radial direction relative to one another only result in compression and a following matching expansion, in each case in the radial direction. A relative movement affected by friction of the connecting device to axially adjacent parts does not occur.

During the use of the seal according to its intended use, said seal is preferentially arranged with the connecting device biased in the radial direction within its installation space. Even in case of radial displacement of the two partial legs relative to one another, use-life reducing tensile stresses in the connecting device are therefore excluded.

The first gap and the second gap preferably each have a substantially matching radial width and each has a substantially matching diameter.

Further, the invention relates to a seal arrangement, comprising a seal, as described above, and a first machine element to be sealed, which is enclosed by a second machine element with a third radial distance, wherein the seal is arranged in the third gap, formed by the third radial distance.

The first machine element can be formed as rod or shaft to be sealed; the second machine element can be formed as a housing.

The seal may be applied, for example, for sealing a shock absorber. In such a case, the first machine element is formed as a piston rod to be sealed, moving translationally back and forth in a housing in to be sealed.

By means of the connecting device, as described at the outset, manufacturing or assembly-related tolerances can be compensated and transverse forces that are operationally introduced into the seal arrangement can be accommodated.

The housing may define a groove-shaped installation space for the seal, wherein the statically stressed seal and the radial leg contact a wall of the housing bordering the installation space.

The second partial leg with its axial leg forms an axial force limiter for the statically stressed seal in the installation space. The assembly of the seal assembly is such that, for example, a tubular housing is used, which is beaded radially inwardly about the axial leg of the second partial leg. On the one hand, this ensures a static seal of the interior of the housing relative to the environment, and on the other hand, an undesirably strong axial compression of the static seal is prevented by the direct contact of the axial leg with the beaded housing.

The first machine element 25 to be sealed in this exemplary embodiment is formed as a piston rod 29 to be sealed of a shock absorber and moves translationally back and forth in axial direction 15 within the second machine element 26, formed by the housing 31 of the shock absorber. Within the housing 31, the substantially groove-shaped installation space 32 for the seal 1 is provided, which is open to the inside in the radial direction 5.

The seal ring 1 has the radial leg 4, which is formed in two parts and comprises the first partial leg 6, arranged radially inwards, and the second partial leg 7, arranged radially outwards. The second partial leg 7, arranged radially outwards, has an axial leg 18 on the circumferential side angled axially against the space 34 to be sealed, that provides an axial force limitation on the statically stressed seal 14 in the installation space 32 during the installation of the seal assembly.

On the side of the seal ring 1 which faces away axially from the space 34 to be sealed, the housing 31 is beaded inward in the radial direction. Due to the axial leg 18 of the second partial leg 7, the statically stressed seal 14 is protected from an undesirably large compression in the axial direction 15 and thereby protected from possible damage.

On the radial leg 4, formed of two parts, there are arranged radially inwards the seal lip 2 and the buffer seal 17, radially outwards the first 19 and the second seal bead 20, each forming a component of the statically stressed seal 14. In the exemplary embodiment shown here, there is further provided a statically stressed additional seal lip 35, operatively connected upstream to the two seal beads 19, 20 in the direction of the space 34 to be sealed.

The seal ring 1 has a design with particularly few parts because the seal lip 2, the buffer seal 17, the statically stressed seal 14 with its two seal beads 19, 20, and the additional seal lip 35 merge integrally into each other and are formed of the same material. Also, the connecting device 10, which is made of an elastomeric, here of the same elastomeric material and, as seen in the illustrated section, has a substantially square cross section 13, and the above-described seals merge integrally into each other and are formed of the same material. The axial length 11 and the radial height 12 are substantially equal. This compact design allows the connecting device to be subjected to comparatively high pressures or pressure peaks, as they occur, for example, in shock absorbers. The seal ring thus has consistently good use properties during a long service life under all operating conditions.

The connecting device 10 connects the two partial legs 6, 7 elastically flexible in the radial direction. For this purpose, the connection device 10 is arranged in the axial direction 15 outside of the first gap 9, which is formed by the first radial distance 8 between the two partial legs 6, 7. The first gap 9 between the partial legs 6, 7 is essentially free of the material of the connecting device 10.

The connecting device 10 is arranged, viewed in the axial direction 15, between the radial leg 4 and the seal beads 19, 20 of the statically stressed seal 14. The connecting device 10 has the form of a web extending in radial direction 5.

The first gap 9 and the second gap 22 each substantially have a matching radial width 23 and matching diameters 24.

The housing 31 encloses the piston rod 29 to be sealed with the third radial distance 27, wherein the seal 1 according to the invention is arranged in the third gap 28, formed by the third radial distance 27.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A seal, comprising:
   a seal ring, having at least one dynamically stressed seal lip;
   a supporting ring comprising a toughened material; and
   a connecting device comprising an elastomeric material,
   wherein the seal ring and the supporting ring are connected to one another,
   wherein the supporting ring comprises a radial leg, to which, in a radial direction, the seal lip is fixed, the radial leg being comprised of two parts including a first partial leg and a second partial leg, the partial legs being disposed adjacent to each other in the radial direction with a first radial distance and delineating a first gap, the first partial leg being connected with the seal lip, the first and the second partial legs being fixed to one another by the connecting device,
   wherein the seal ring includes at least one statically stressed seal having a first and a second seal bead disposed adjacent to one another at a second radial distance,
   wherein a second gap formed by the second radial distance is substantially free of a material of the statically stressed seal, wherein the first gap and the second gap have substantially matching diameters, and
wherein the connecting device, when viewed in cross section, has an axial length and a radial height, the axial length substantially corresponding to the radial height.

2. The seal according to claim 1, wherein the connecting device, when viewed in cross section, has a substantially square cross section.

3. The seal according to claim 1, wherein the connecting device comprises an integral part of the statically stressed seal.

4. The seal according to claim 1, wherein the first gap, formed through the first radial distance, is substantially free of the material of the connecting device.

5. The seal according to claim 1, wherein the connecting device is arranged on a side of the radial leg facing away from the seal lip in an axial direction and covers a matching end face of the first gap in the radial direction.

6. The seal according to claim 1, further comprising a buffer seal for the seal lip arranged on a side of the radial leg which faces axially away from the seal lip.

7. The seal according to claim 6, wherein the buffer seal and the seal lip are formed integrally of a same material.

8. The seal according to claim 6, wherein the static seal and the buffer seal are formed merging integrally and are of a same material.

9. The seal according to claim 1, wherein the second partial leg radially encloses the first partial leg around an outer circumference thereof and has an axial leg.

10. The seal according to claim 9, wherein the axial leg protrudes axially against the seal lip.

11. A seal assembly, comprising:
the seal according to claim 1, further comprising
a first machine element to be sealed, which is enclosed by a second machine element, having a third radial distance,
wherein the seal is arranged in a third gap formed by the third radial distance.

12. The seal assembly according to claim 11, wherein the first machine element comprises a rod or shaft to be sealed and the second machine element comprises a housing.

13. The seal assembly according to claim 12, wherein the housing delineates a groove-shaped installation space for the seal, and
wherein the statically stressed seal and the radial leg abuttingly touch a wall of the housing, limiting the installation space.

14. The seal assembly according to claim 11, wherein the second partial leg forms with an axial limb thereof an axial force limiter for the statically stressed seal in the installation space.

* * * * *